(12) United States Patent
Ghaus et al.

(10) Patent No.: US 8,144,639 B1
(45) Date of Patent: Mar. 27, 2012

(54) DYNAMIC MODE TRANSITION BASED ON RESOURCE UTILIZATION AND USER APPLICATION

(75) Inventors: Mohammad Ghaus, Ashburn, VA (US); PinalKumari K. Tailor, Ashburn, VA (US); Esmail Hejazi Dinan, Herndon, VA (US); Hetal J. Mistry, Herndon, VA (US)

(73) Assignee: Clearwire IP Holdings, LLC, Bellevue, WA (US)

( * ) Notice: Subject to any disclaimer, the term of this patent is extended or adjusted under 35 U.S.C. 154(b) by 644 days.

(21) Appl. No.: 12/271,084

(22) Filed: Nov. 14, 2008

(51) Int. Cl.
*G08C 17/00* (2006.01)
(52) U.S. Cl. .................................... 370/311; 455/574
(58) Field of Classification Search .................. 370/311; 455/574
See application file for complete search history.

(56) References Cited

U.S. PATENT DOCUMENTS

| | | |
|---|---|---|
| 2007/0211654 A1* | 9/2007 | Kim et al. .................. 370/318 |
| 2007/0223434 A1 | 9/2007 | Bennett |
| 2007/0225026 A1 | 9/2007 | Bennett |
| 2007/0238417 A1 | 10/2007 | Bennett |
| 2008/0009328 A1 | 1/2008 | Narasimha |
| 2008/0020808 A1 | 1/2008 | Wang et al. |
| 2008/0075033 A1* | 3/2008 | Shattil ....................... 370/328 |

* cited by examiner

Primary Examiner — Kevin C Harper
Assistant Examiner — Sai-Ming Chan
(74) Attorney, Agent, or Firm — O'Brien Jones, PLLC

(57) ABSTRACT

A wireless communication system comprises a mode transition control system. The mode transition control system comprises a communication interface and a processing system. The communication interface is configured to receive first information for a first user. The processing system is configured to process the first information and select a first mode transition sequence for the first user, wherein the first mode transition sequence comprises an active mode to sleep mode to idle mode transition, and an idle mode to sleep mode to active mode transition. The communication interface is configured to receive second information for a second user. The processing system is configured to process the second information and select a second mode transition sequence for the second user, wherein the second mode transition sequence comprises an active mode to sleep mode transition, and a sleep mode to active mode transition. The communication interface is configured to receive third information for a third user. The processing system is configured to process the third information and select a third mode transition sequence for the third user, wherein the third mode transition sequence comprises an active mode to idle mode transition, and an idle mode to active mode transition. The communication interface is configured to transfer the first mode transition sequence to the first user for use by the first user, transfer the second mode transition sequence to the second user for use by the second user, and transfer the third mode transition sequence to the third user for use by the third user.

16 Claims, 6 Drawing Sheets

DYNAMIC MODE TRANSITION BASED ON RESOURCE UTILIZATION AND USER APPLICATION

TECHNICAL BACKGROUND

A mobile communication device and its serving base station wirelessly communicate to provide voice, Internet, email, text, video, and other applications. To conserve battery power, a mobile communication device may enter into a sleep mode or an idle mode when not actively receiving application data. In sleep mode, the mobile communication device conducts pre-negotiated periods of inactivity with the serving base station air interface. However, the mobile device remains registered with the serving base station, allowing the device to continue running active applications during sleep mode.

In idle mode, however, the mobile device does not remain registered with the serving base station and releases all network resources. By deregistering from the base station, idle mode removes the mobile device's active requirement to perform handover procedures between base stations. The mobile device becomes periodically available to receive downlink broadcast traffic messages without registration at a specific base station. If the idle mobile device detects pending traffic at the network, the device must again register with a base station to receive such data. This re-registration process can add significant delay in reconnecting the mobile device to the network prior to receiving the pending traffic.

OVERVIEW

A wireless communication system comprises a mode transition control system. The mode transition control system comprises a communication interface and a processing system. The communication interface is configured to receive first information for a first user. The processing system is configured to process the first information and select a first mode transition sequence for the first user, wherein the first mode transition sequence comprises an active mode to sleep mode to idle mode transition, and an idle mode to sleep mode to active mode transition. The communication interface is configured to receive second information for a second user. The processing system is configured to process the second information and select a second mode transition sequence for the second user, wherein the second mode transition sequence comprises an active mode to sleep mode transition, and a sleep mode to active mode transition. The communication interface is configured to receive third information for a third user. The processing system is configured to process the third information and select a third mode transition sequence for the third user, wherein the third mode transition sequence comprises an active mode to idle mode transition, and an idle mode to active mode transition. The communication interface is configured to transfer the first mode transition sequence to the first user for use by the first user, transfer the second mode transition sequence to the second user for use by the second user, and transfer the third mode transition sequence to the third user for use by the third user.

In some examples, the first information indicates a first quality-of-service level for the first user, the second information indicates a second quality-of-service level for the second user, and the third information indicates a third quality-of-service level for the third user.

In some examples, the first information indicates a first mobility factor for the first user, the second information indicates a second mobility factor for the second user, and the third information indicates a third mobility factor for the third user.

In some examples, the first information indicates a first read time for the first user, the second information indicates a second read time for the second user, and the third information indicates a third read time for the third user.

In some examples, the first information indicates a first location for the first user, the second information indicates a second location for the second user, and the third information indicates a third location for the third user.

In some examples, the first information indicates a first session type for the first user, the second information indicates a second session type for the second user, and the third information indicates a third session type for the third user.

In some examples, the sleep mode comprises a mobile device in a first state of inactivity with a serving base station air interface and the mobile device maintains first network resources, and the idle mode comprises the mobile device in a second state of inactivity with the serving base station air interface and the mobile device releases second network resources.

In some examples, the processing system is configured to monitor network conditions to determine a network load, and process the first information, the second information, and the third information in response to determining the network load.

In some examples, the processing system is configured to monitor network conditions to determine when the network load reaches a threshold level.

In some examples, the wireless communication system is a Worldwide Interoperability for Microwave Access (WiMAX) system.

A method of operating a wireless communication system comprises receiving and processing first information for a first user to select a first mode transition sequence for the first user, wherein the first mode transition sequence comprises an active mode to sleep mode to idle mode transition, and an idle mode to sleep mode to active mode transition. The method comprises receiving and processing second information for a second user to select a second mode transition sequence for the second user, wherein the second mode transition sequence comprises an active mode to sleep mode transition, and a sleep mode to active mode transition. The method comprises receiving and processing third information for a third user to select a third mode transition sequence for the third user, wherein the third mode transition sequence comprises an active mode to idle mode transition, and an idle mode to active mode transition. The method comprises transferring the first mode transition sequence to the first user for use by the first user, transferring the second mode transition sequence to the second user for use by the second user, and transferring the third mode transition sequence to the third user for use by the third user.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
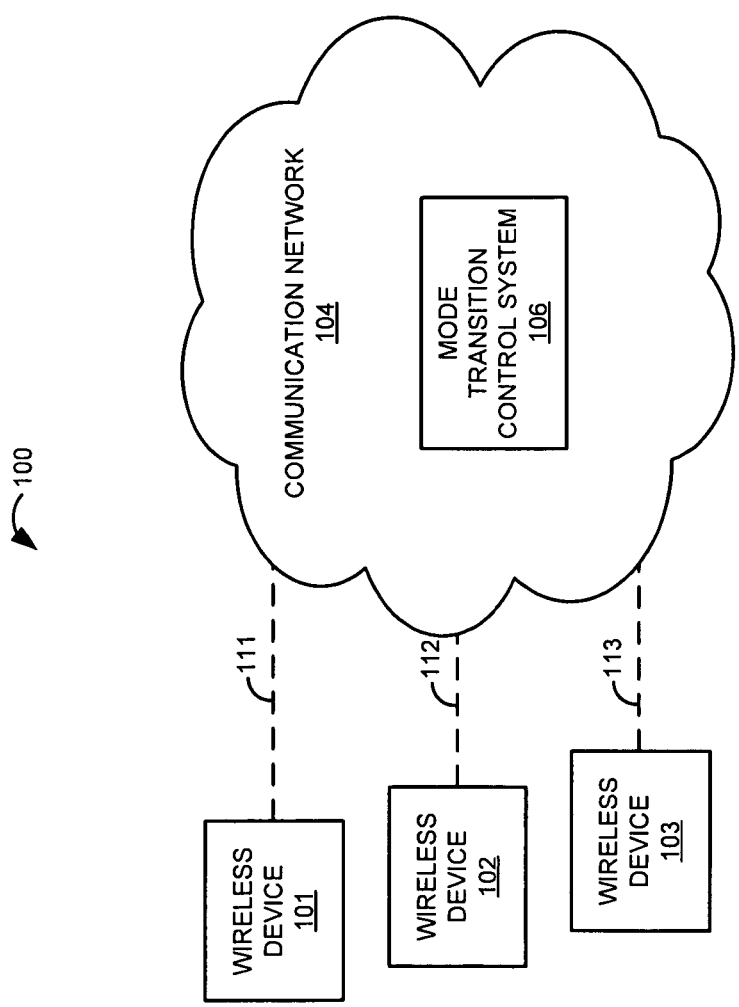
FIG. 1 illustrates a wireless communication system.

FIG. 1 illustrates wireless communication system 100. Wireless communication system 100 comprises wireless devices 101-103 and communication network 104. Communication network 104 comprises mode transition control system 106. Wireless device 101 and communication network 104 communicate over wireless communication link 111. Wireless device 102 and communication network 104 communicate over wireless communication link 112. Wireless device 103 and communication network 104 communicate over wireless communication link 113. Note that the number of wireless devices depicted in FIG. 1 would typically be greater, but only a limited number is shown herein for clarity.

Wireless devices 101-103 may be any device that has wireless communication connectivity that may be readily moved from one location to another. Wireless devices 101-103 comprise hardware and circuitry programmed to function as a telecommunications device. For example, wireless devices 101-103 could comprise telephones, transceivers, smartphones, mobile phones, cellular phones, personal digital assistants (PDAs), personal communicators, handheld game consoles, Internet access devices, personal computers (PCs), Ultra-Mobile personal computers (UMPCs), handheld televisions, or some other consumer appliance with wireless communication capabilities—including combinations thereof.

Three different modes of operation for wireless devices 101-103 are contemplated herein. In active mode, wireless devices 101-103 have been assigned network resources and all required connection identifiers. Wireless devices 101-103 are continuously performing uplink and downlink activity and are engaged in active communication with communication network 104. In sleep mode, wireless devices 101-103 remain absent from a serving base station's air interface for pre-negotiated intervals. However, the wireless devices retain network resources by remaining registered with communication network 104. In idle mode, wireless devices 101-103 deregister with communication network 104 and release all network resources.

Communication network 104 may comprise any wireless network that provides communication connectivity for wireless devices 101-103 to send and receive data. Communication network 104 comprises base stations, wireless communication nodes, telephony switches, internet routers, network gateways, computer systems, communication links, or some other type of communication equipment—including combinations thereof. Wireless network protocols that may be utilized by communication network 104 may comprise code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), or any other wireless network protocol that facilitates communication between communication network 104 and wireless devices 101-103.

The wireless communication links 111-113 between the user wireless devices 101-103 and communication network 104 use the air or space as the transport media. These wireless communication links 111-113 may use various protocols, such as wireless fidelity, Code Division Multiple Access (CDMA), Global System for Mobile communications (GSM), Worldwide Interoperability for Microwave Access (WiMAX), Long Term Evolution (LTE), Internet, telephony, or some other communication format—including combinations thereof.

Mode transition control system 106 comprises a computer system. Mode transition control system 106 may be a discrete system or may be integrated within other systems—including other systems within communication network 104. Mode transition control system 106 may reside in a single device or may be distributed across multiple devices.

Figure 2:
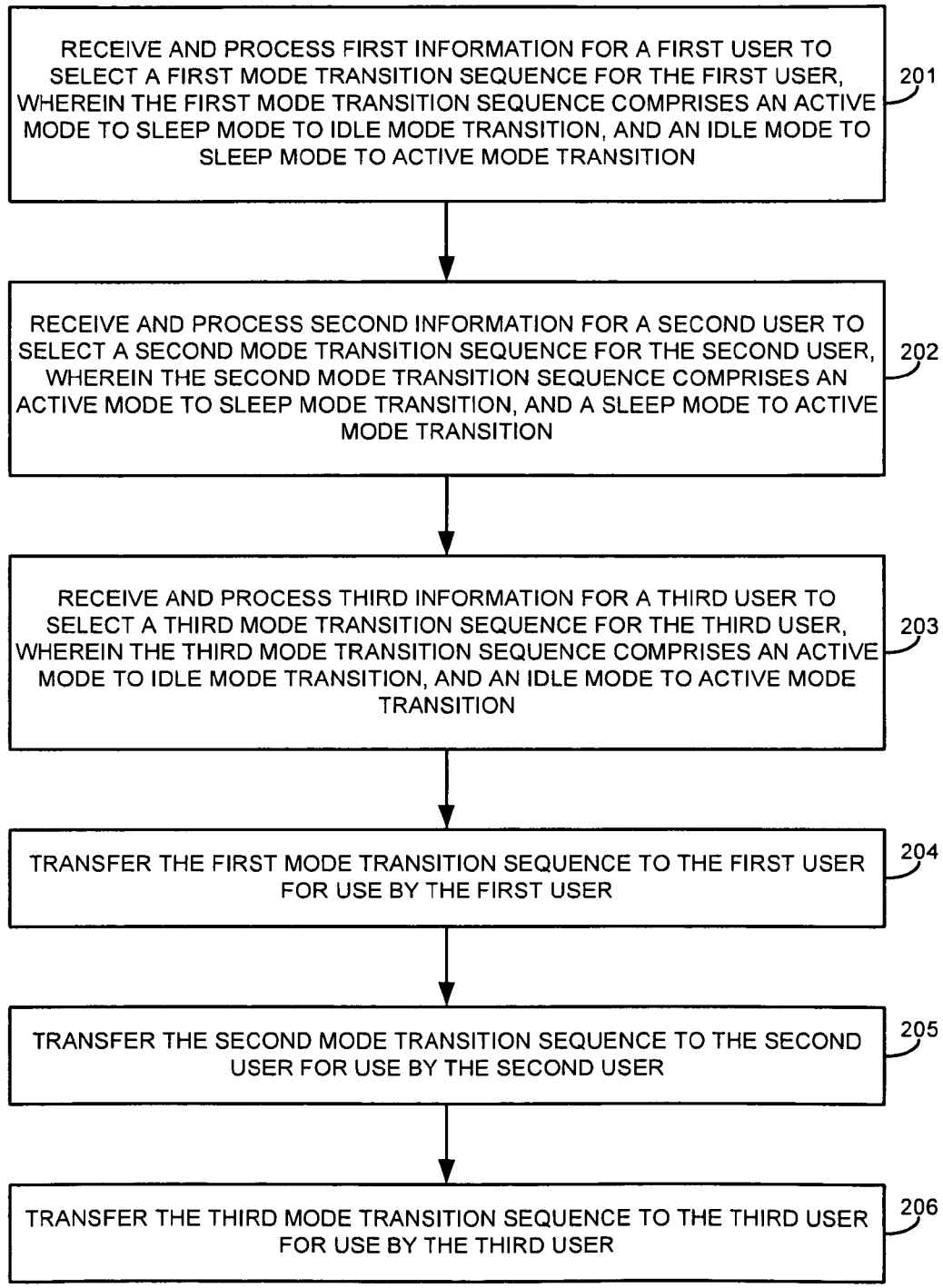
FIG. 2 illustrates the operation of the wireless communication system.

FIG. 2 illustrates the operation of wireless communication system 100. The operation begins with mode transition control system 106 receiving from wireless device 101 first information for a first user over wireless communication link 111 (201). Mode transition control system 106 then processes the first information to select a first mode transition sequence for the first user (201). The first mode transition sequence comprises an active mode to sleep mode to idle mode transition, and an idle mode to sleep mode to active mode transition (201). For example, wireless device 101 may receive this mode transition sequence while active, transition to sleep mode for a specified amount of time, and then transition to idle mode after the specified time has elapsed. In this example, wireless device 101 would not deregister with communication network 104 and transition to idle mode until the specified sleep mode period had elapsed. According to the above mode transition sequence, once in idle mode, wireless device 101 must transition back to sleep mode before returning to active mode. Once mode transition control system 106 has selected the first mode transition sequence for the first user in operation 201, mode transition control system 106 transfers the first mode transition sequence to the first user's communication device 101 over wireless communication link 111 for use by the first user (204).

Similarly, mode transition control system 106 receives from wireless device 102 second information for a second user over wireless communication link 112 (202). Mode transition control system 106 then processes the second information to select a second mode transition sequence for the second user (202). The second mode transition sequence comprises an active mode to sleep mode transition, and a sleep mode to active mode transition (202). In this mode transition sequence, a wireless device would not have to endure idle mode and its detriments. For example, wireless device 102 may receive this mode transition sequence while active, transition to sleep mode for a specified amount of time, and then return to active mode after the time expires, without ever having to transition to idle mode. Once mode transition control system 106 has selected the second mode transition sequence for the second user in operation 202, mode transition control system 106 transfers the second mode transition sequence to the second user's communication device 102 over wireless communication link 112 for use by the second user (205).

Likewise, mode transition control system 106 receives from wireless device 103 third information for a third user over wireless communication link 113 (203). Mode transition control system 106 then processes the third information to select a third mode transition sequence for the third user (203). The third mode transition sequence comprises an active mode to idle mode transition, and an idle mode to active mode transition (203). In this mode transition sequence, a wireless device would not transition to sleep mode and enjoy its benefits. For example, wireless device 103 may receive this mode transition sequence while active, transition to idle mode for a specified amount of time, and then return to active mode after the time expires, without ever transitioning to sleep mode. Once mode transition control system 106 has selected the third mode transition sequence for the third user in operation 203, mode transition control system 106 transfers the third mode transition sequence to the third user's communication device 103 over wireless communication link 113 for use by the third user (206).

The first, second, and third information received by mode transition control system 106 comprises various user-specific information, such as a user's quality-of-service level, mobility factor, read time, location, session type, signal strength, or other statistical metrics. A user's mobility factor comprises a velocity of the user's wireless device as it travels. A user's read time comprises a period of inactivity during which the user's wireless device is not actively receiving application data. For example, if a user accesses an email message on a wireless device, there may be a relatively long period of time during which no data is transmitted to the user's wireless device, until the user accesses a new email message. In another example, a user viewing streaming video may have a relatively short read time during which buffered video is displayed to the user before additional data must be sent to the user's device to refill the buffer. A user's location comprises a distance between a user's wireless device and a serving base station. A user's session type comprises various wireless applications, such as real-time voice transmissions, low bandwidth data transfers such as email, text, and web surfing, or high bandwidth data transfers such as streaming video.

The information may also comprise information received from sources other than a wireless device. For example, the information may comprise information from communication network 104. An example of information obtained from communication network 104 is a network load. The network load comprises an amount of service demand the network is receiving from wireless devices. In other words, the network load comprises network resource utilization. In some embodiments, the method of FIG. 2 further comprises monitoring network conditions to determine a network load, and wherein processing the first information, the second information, and the third information comprises processing the first information, the second information, and the third information in response to determining the network load. In another embodiment, monitoring network conditions to determine the network load further comprises monitoring network conditions to determine when the network load reaches a threshold level. For example, wireless communication service providers may establish certain thresholds for determining whether the network load has increased to a level that warrants employment of the method of FIG. 2.

When processing the information, mode transition control system 106 may apply a priority scheme to any statistical metrics under consideration. For example, mode transition control system 106 may determine a priority for the quality-of-service level or session type. Based on the results of processing the information, mode transition control system 106 selects a mode transition sequence for the user. For example, mode transition control system 106 may have selected the second mode transition sequence for the second user in operation 202 because the second information indicated a high priority quality-of-service level, a high bandwidth session type such as streaming video, a short application read time, and a low mobility factor. In this example, by instructing the second user's wireless device 102 to transition to sleep mode instead of idle mode during inactivity or read time periods, wireless device 102 will conserve battery power but still remain registered with the network.

In another example, mode transition control system 106 may have selected the third mode transition sequence for the third user in operation 203 because the third information indicated a low quality-of-service level, a low bandwidth session type such as email, a long application read time, and a high mobility factor moving outwards from a serving base station. In this example, by instructing the third user's wireless device 103 to transition to idle mode instead of sleep mode during inactivity or read time periods, wireless device 103 will conserve battery power and deregister from the network so that network resources are not wasted unnecessarily during the long periods of read time.

Figure 3:
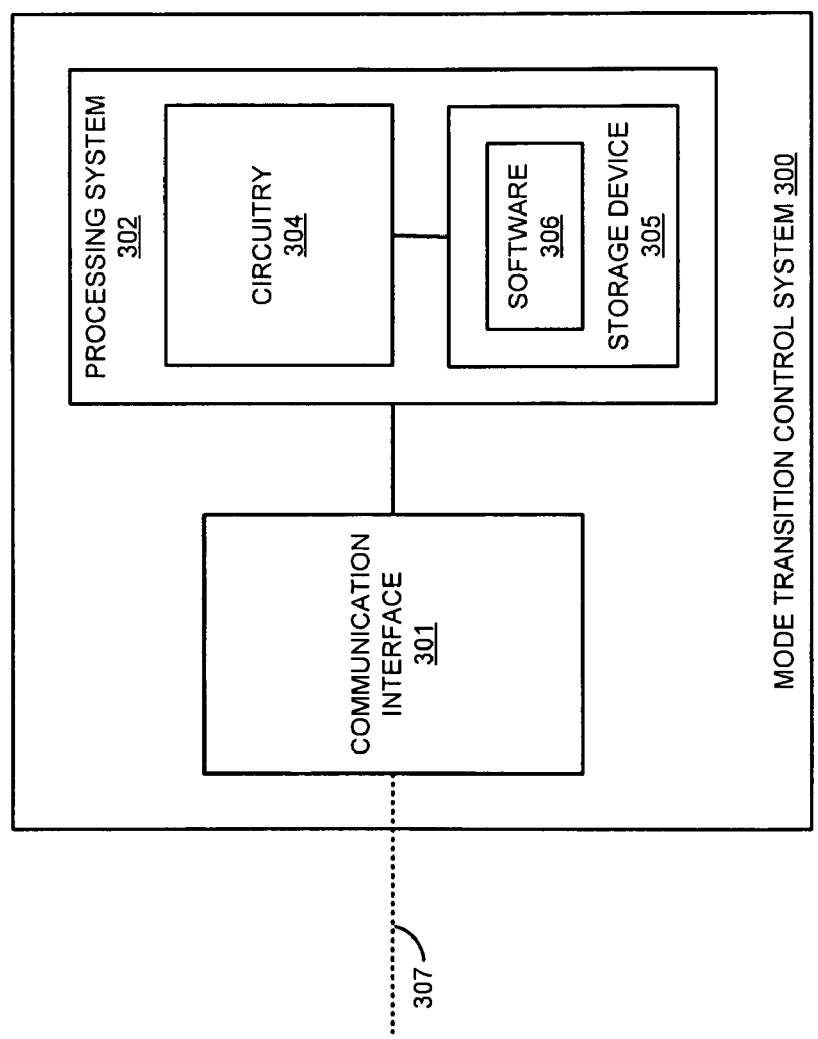
FIG. 3 illustrates a mode transition control system.

FIG. 3 illustrates mode transition control system 300. Mode transition control system 300 provides an example of mode transition control system 106, although system 106 may use other configurations. Mode transition control system 300 comprises communication interface 301 and processing system 302. Processing system 302 is linked to communication interface 301. Processing system 302 includes circuitry 304 and storage device 305 that stores operating software 306.

Communication interface 301 comprises components that transmit and receive communication signals over communication link 307 under the control of processing system 302. These components include transceiver and signal processing circuitry. The received communication signals include information for specific users. The transmitted communication signals comprise mode transition sequence assignments for the specific users.

Circuitry 304 comprises microprocessor and associated circuitry that retrieves and executes operating software 306 from storage device 305. Storage device 305 comprises a disk drive, flash drive, memory circuitry, or some other memory device. Operating software 306 comprises computer programs, firmware, or some other form of machine-readable processing instructions. Although storage device 305 is shown within mode transition control system 300, a portion of storage device 305 could be externally located. For example, storage device 305 may comprise an external memory apparatus that stores software 306 for subsequent transfer to an internal memory device within mode transition control system 300.

When executed by circuitry 304, operating software 306 directs processing system 302 to operate mode transition control system 300 as described herein. In particular, operating software 306 directs processing system 302 to select mode transition sequences for specific users based on information supplied by the users. Thus, processing system 302 processes information for specific users to provide mode transition sequence assignments for the specific users.

Figure 4:
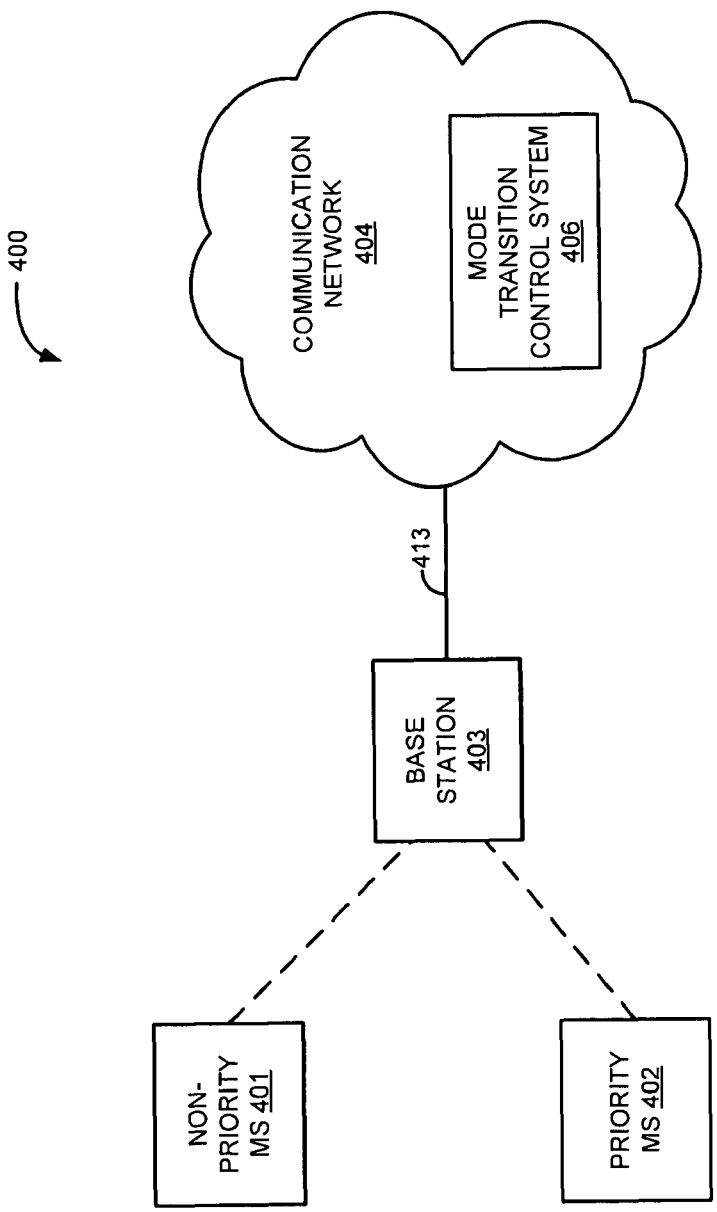
FIG. 4 illustrates a wireless communication system.

FIG. 4 illustrates wireless communication system 400. Wireless communication system 400 comprises non-priority mobile station (MS) 401, priority MS 402, base station (BS) 403, and communication network 404. Communication network 404 includes mode transition control system 406. Wireless communication system 400 comprises a worldwide interoperability for microwave access system. Note that the number of mobile stations depicted in FIG. 4 would typically be greater, but only a limited number is shown herein for clarity.

Non-priority MS 401 comprises a wireless communication device with a low quality-of-service level. Priority MS 402 comprises a wireless communication device with a high quality-of-service level, such as a premium service level user. Mobile stations 401-402 may operate in active mode, sleep mode, or idle mode. Mobile stations 401-402 communicate with base station 403 over wireless communication links. Base station 403 communicates with communication network 404 over communication link 413 using metal, glass, fiber, air, or some other material as the transport media. Communication link 413 may be a direct link or may include various intermediate communication nodes, systems, or networks.

Figure 5:
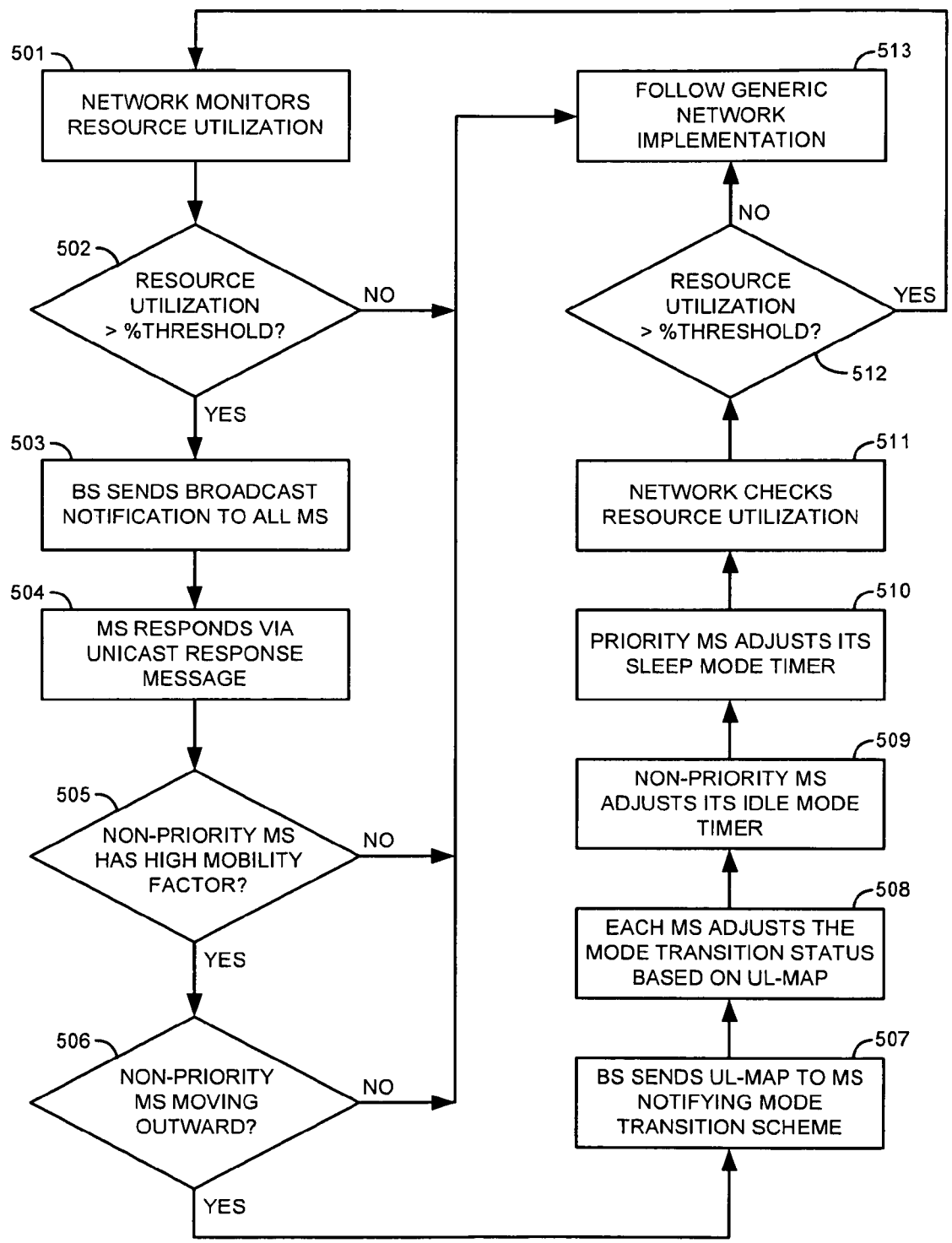
FIG. 5 illustrates the operation of the wireless communication system.

FIG. 5 illustrates the operation of wireless communication system 400. Mode transition control system 406 continually monitors network resource utilization (501). Mode transition control system 406 compares the network resource utilization to a percent threshold (502). The percent threshold may be set to any level, which, when reached, allows the method of FIG. 5 to proceed. In one embodiment, the percent threshold is set to a level where an optimization limit for the Radio Access Network (RAN) resource utilization is reached. If the resource utilization is less than the percent threshold, then communication network 404 follows the generic network implementation (513). However, if the resource utilization is greater than the percent threshold, then base station 403 sends a broadcast notification to MS 401 and MS 402 (503). The broadcast notification of operation 503 comprises a request for information from all mobile stations. The information requested in the broadcast notification could comprise a mobile station's read time, mobility factor, quality-of-service classification, session type, priority scheme, location, and signal strength, among other status metrics. After receiving the broadcast notification message from base station 403, mobile stations 401-402 respond by sending their respective information in a unicast response message to base station 403 (504).

Various constraints are then analyzed by mode transition control system 406 to determine whether to transmit mode transition sequences to the mobile stations. Mode transition control system 406 determines whether non-priority MS 401 has a high mobility factor (505). If non-priority MS 401 does not have a high mobility factor, then communication network 404 follows the generic network implementation (513). However, if non-priority MS 401 has a high mobility factor, then mode transition control system 406 determines whether non-priority MS 401 is moving outward from base station 403 (506). If non-priority MS 401 is not moving outward from base station 403, then communication network 404 follows the generic network implementation (513). However, if non-priority MS 401 is moving outward from base station 403, then mode transition control system 406 will proceed with the method of FIG. 5 and transmit mode transition sequences to the mobiles stations.

In some embodiments, additional constraints are analyzed at this point prior to continuing with the method of FIG. 5. In one embodiment, mode transition control system 406 may only proceed to operation 507 if a majority of priority mobile stations such as priority MS 402 are in a very good radio frequency (RF) environment. In another embodiment, mode transition control system 406 may only proceed to operation 507 if a majority of non-priority mobile stations such as non-priority MS 401 have a session type indicating low bandwidth data applications such as email or web browsing. In another embodiment, mode transition control system 406 may only proceed to operation 507 if a majority of priority mobile stations such as priority MS 402 have a session type indicating high bandwidth data applications such as streaming video. In yet another embodiment, mode transition control system 406 may only proceed to operation 507 by applying combinations of the above criteria. If mode transition control system does not proceed to operation 507, then communication network 404 follows the generic network implementation (513).

Once mode transition control system 406 has determined sufficient conditions exist to warrant transmission of mode transition sequences to the mobile stations, system 406 instructs base station 403 to send a compressed uplink map (UL-MAP) to each MS notifying each MS of its mode transition scheme (507). The UL-MAP directs each MS to transition to the appropriate mode.

Each MS adjusts its mode transition status based on the UL-MAP (508). Non-priority MS 401 adjusts its idle mode timer (509). In one example, non-priority MS 401 only adjusts its idle mode timer, and does not set its sleep mode timer, so that non-priority MS 401 only transitions from active mode to idle mode. In another example, non-priority MS 401 adjusts its idle mode timer, and sets its sleep mode timer to zero, so that the sleep mode timer immediately expires and non-priority MS 401 immediately transitions to idle mode.

Priority MS 402 adjusts its sleep mode timer (510). Priority MS 402 transitions from active mode to sleep mode. In one example, priority MS 402 only adjusts its sleep mode timer, and does not set its idle mode timer, so that priority MS 402 only transitions from active mode to sleep mode. In another example, priority MS 402 adjusts its sleep mode timer, and sets its idle mode timer to zero, so that priority MS 402 transitions to sleep mode for the time set in the sleep mode timer, and never transitions to idle mode.

The idle mode and sleep mode timers may be determined based on any number of status metrics. In one embodiment, mode transition control system 406 determines the timers based on a function of application read time, mobility factor, and network load percentage. In another embodiment, the timers are set based on a function of application read time, mobility factor, and a location of the MS.

After non-priority MS 401 has set its idle timer, and priority MS 402 has set its sleep timer, mode transition control system 406 again checks the resource utilization of communication network 404 (511). Mode transition control system 406 compares the network resource utilization to a percent threshold (512). If the resource utilization is less than the percent threshold, then communication network 404 follows the generic network implementation (513). However, if the resource utilization is greater than the percent threshold, then mode transition control system 406 continually monitors network resource utilization (501), and again applies the method steps of FIG. 5.

Figure 6:
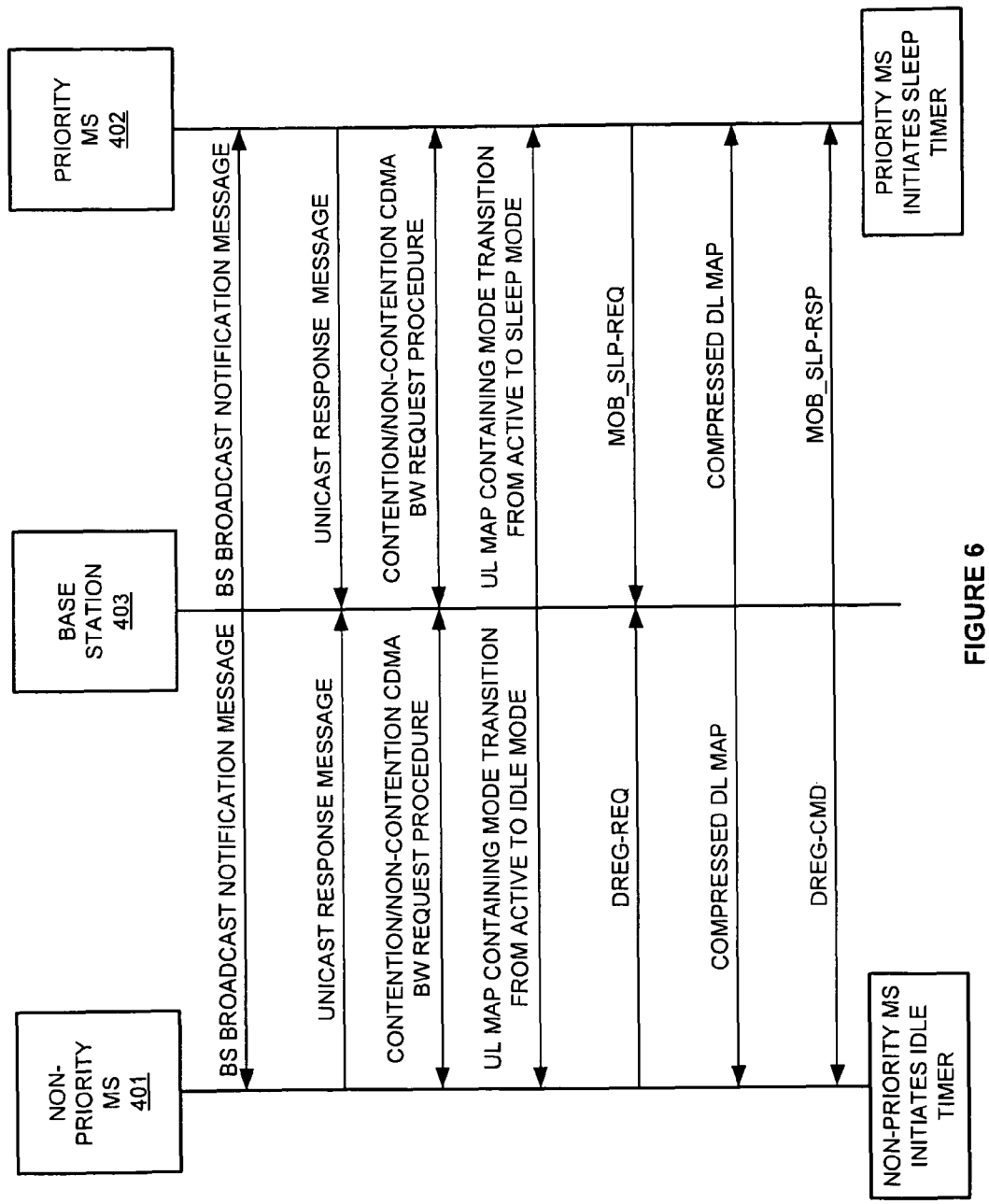
FIG. 6 illustrates the operation of the wireless communication system.

FIG. 6 illustrates the operation of wireless communication system 400. Base station 403 sends a broadcast notification message to MS 401 and 402. The broadcast notification message comprises a request for information from mobile stations 401-402. The information requested in the broadcast notification message could comprise a mobile station's read time, mobility factor, quality-of-service classification, session type, priority scheme, location, and signal strength, among other status metrics. After receiving the broadcast notification message from base station 403, mobile stations 401-402 respond by sending their respective information in a unicast response message to base station 403.

Non-priority MS 401 will delete all dynamic service flows using the MS service flow deletion procedure. Non-priority MS 401 obtains an uplink (UL) allocation for the deregistration request (DREG-REQ) using the contention or non-contention code division multiple access bandwidth (CDMA BW) request procedure, if polled. Similarly, priority MS 402 obtains a UL allocation for the mobile sleep request (MOB_SLP-REQ) using the contention or non-contention CDMA BW request procedure, if polled. Base station 403 sends to non-priority MS 401 the hybrid automatic repeat request (HARQ) uplink map (UL-MAP) in the compressed UL-MAP to provide a UL allocation for MS 401 to send the DREG-REQ. The UL allocation for DREG-REQ includes uplink interval usage code (UIUC) and connection identification (CID) field. Likewise, base station 403 sends to priority MS 402 the HARQ UL-MAP in the compressed UL-MAP to provide a UL allocation for the MS to send the MOB_SLP-REQ. The UL allocation for MOB_SLP-REQ includes UIUC and CID field.

Non-priority MS 401 decodes the HARQ UL-MAP in the compressed UL-MAP in frame and builds DREG-REQ protocol data unit (PDU). Non-priority MS 401 sends the DREG-REQ message to base station 403 with DREG-REQ type/length/value (TLV) list (idle mode) which comprises the deregistration request code, idle mode retain information, network re-entry information, and cipher-based message authentication code (CMAC). Similarly, priority MS 402 decodes the HARQ UL-MAP in the compressed UL-MAP in frame and builds MOB_SLP-REQ PDU. Priority MS 402 sends the MOB_SLP-REQ message to base station 403 indicating a set of parameters that the MS would like to have applied like power saving class, types, and the like.

Base station 403 receives DREG-REQ and MOB_SLP-REQ and determines that they are both from valid mobile stations. Base station 403 evaluates the requests as indicated in DREG-REQ and MOB_SLP-REQ and sets values based on its scheduling. Base station 403 sends the HARQ downlink map (DL-MAP) in the compressed DL-MAP to provide a downlink (DL) allocation for the deregistration command (DREG-CMD). The DL allocation for the DREG-CMD includes downlink interval usage code (DIUC) and repetition coding indication determined by BS scheduler CID. Similarly, base station 403 sends the HARQ DL-MAP in the compressed DL-MAP to provide a DL allocation for the mobile sleep response (MOB_SLP-RSP) message.

Base station 403 sends the DREG-CMD message with DREG-CMD TLV list (idle mode) to force non-priority MS 401 to change its access state in response to the DREG-REQ message. The DREG-CMD includes paging information, idle mode retain information, and CMAC Likewise, base station 403 sends the MOB_SLP-RSP message to force priority MS 402 to set its parameters in response to the MOB_SLP-REQ message.

Base station 403 starts the management resource holding timer, and non-priority MS 401 decodes the DREG-CMD message while priority MS 402 decodes the MOB_SLP-RSP message. Non-priority MS 401 verifies that the received DREG-CMD is from a valid base station and starts its idle mode timer, which may comprise a function of the application read time of non-priority MS 401. Similarly, priority MS 402 verifies that the received MOB_SLP-RSP is from a valid base station and starts its sleep mode timer, which may comprise a function of the application read time of priority MS 402.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, the method comprising:
    receiving and processing first information for a first user to select a first mode transition sequence for the first user, wherein the first mode transition sequence comprises an active mode to sleep mode to idle mode transition, and an idle mode to sleep mode to active mode transition;
    receiving and processing second information for a second user to select a second mode transition sequence for the second user, wherein the second mode transition sequence comprises an active mode to sleep mode transition, and a sleep mode to active mode transition;
    receiving and processing third information for a third user to select a third mode transition sequence for the third user, wherein the third mode transition sequence comprises an active mode to idle mode transition, and an idle mode to active mode transition,
    wherein the first information indicates a first quality-of-service level for the first user, wherein the second information indicates a second quality-of-service level for the second user, and wherein the third information indicates a third quality-of-service level for the third user, and
    wherein the sleep mode comprises a mobile device in a first state of inactivity with a serving base station air interface and the mobile device maintains first network resources, and wherein the idle mode comprises the mobile device in a second state of inactivity with the serving base station air interface and the mobile device releases second network resources;
    transferring the first mode transition sequence to the first user for use by the first user;
    transferring the second mode transition sequence to the second user for use by the second user; and
    transferring the third mode transition sequence to the third user for use by the third user.

2. The method of claim 1 wherein the first information indicates a first mobility factor for the first user, wherein the second information indicates a second mobility factor for the second user, and wherein the third information indicates a third mobility factor for the third user.

3. The method of claim 1 wherein the first information indicates a first read time for the first user, wherein the second information indicates a second read time for the second user, and wherein the third information indicates a third read time for the third user.

4. The method of claim 1 wherein the first information indicates a first location for the first user, wherein the second information indicates a second location for the second user, and wherein the third information indicates a third location for the third user.

5. The method of claim 1 wherein the first information indicates a first session type for the first user, wherein the second information indicates a second session type for the second user, and wherein the third information indicates a third session type for the third user.

6. The method of claim 1 further comprising:
    monitoring network conditions to determine a network load, and wherein processing the first information, the second information, and the third information comprises processing the first information, the second information, and the third information in response to determining the network load.

7. The method of claim 6 wherein monitoring network conditions to determine the network load further comprises monitoring network conditions to determine when the network load reaches a threshold level.

8. The method of claim 1 wherein the wireless communication system is a Worldwide Interoperability for Microwave Access (WiMAX) system.

9. A mode transition control system of a wireless communication system, the mode transition control system comprising:
 a communication interface configured to receive first information for a first user;
 a processing system configured to process the first information and select a first mode transition sequence for the first user, wherein the first mode transition sequence comprises an active mode to sleep mode to idle mode transition, and an idle mode to sleep mode to active mode transition;
 the communication interface configured to receive second information for a second user;
 the processing system configured to process the second information and select a second mode transition sequence for the second user, wherein the second mode transition sequence comprises an active mode to sleep mode transition, and a sleep mode to active mode transition;
 the communication interface configured to receive third information for a third user;
 the processing system configured to process the third information and select a third mode transition sequence for the third user, wherein the third mode transition sequence comprises an active mode to idle mode transition, and an idle mode to active mode transition; and
 the communication interface configured to transfer the first mode transition sequence to the first user for use by the first user, transfer the second mode transition sequence to the second user for use by the second user, and transfer the third mode transition sequence to the third user for use by the third user,
 wherein the first information indicates a first quality-of-service level for the first user, wherein the second information indicates a second quality-of-service level for the second user, and wherein the third information indicates a third quality-of-service level for the third user, and
 wherein the sleep mode comprises a mobile device in a first state of inactivity with a serving base station air interface and the mobile device maintains first network resources, and wherein the idle mode comprises the mobile device in a second state of inactivity with the serving base station air interface and the mobile device releases second network resources.

10. The mode transition control system of claim 9 wherein the first information indicates a first mobility factor for the first user, wherein the second information indicates a second mobility factor for the second user, and wherein the third information indicates a third mobility factor for the third user.

11. The mode transition control system of claim 9 wherein the first information indicates a first read time for the first user, wherein the second information indicates a second read time for the second user, and wherein the third information indicates a third read time for the third user.

12. The mode transition control system of claim 9 wherein the first information indicates a first location for the first user, wherein the second information indicates a second location for the second user, and wherein the third information indicates a third location for the third user.

13. The mode transition control system of claim 9 wherein the first information indicates a first session type for the first user, wherein the second information indicates a second session type for the second user, and wherein the third information indicates a third session type for the third user.

14. The mode transition control system of claim 9 further comprising:
 the processing system configured to monitor network conditions to determine a network load, and wherein the processing system configured to process the first information, the second information, and the third information comprises the processing system configured to process the first information, the second information, and the third information in response to determining the network load.

15. The mode transition control system of claim 14 wherein the processing system configured to monitor network conditions to determine the network load comprises the processing system configured to monitor network conditions to determine when the network load reaches a threshold level.

16. The mode transition control system of claim 9 wherein the wireless communication system is a Worldwide Interoperability for Microwave Access (WiMAX) system.

\* \* \* \* \*